(12) United States Patent
Silvery et al.

(10) Patent No.: US 12,374,966 B2
(45) Date of Patent: Jul. 29, 2025

(54) ATTACHMENT OF A TEMPERATURE SENSOR TO AN INTERCONNECTION RING OF AN ELECTRIC MACHINE

(71) Applicant: Schaeffler Technologies AG & Co. KG, Herzogenaurach (DE)

(72) Inventors: Christian Silvery, Walzbachtal (DE); Sven Derksen, Offenburg (DE); Marie-Luise Anke, Karlsruhe (DE)

(73) Assignee: Schaeffler Technlogies AG & Co. KG, Herzogenaurach (DE)

( * ) Notice: Subject to any disclaimer, the term of this patent is extended or adjusted under 35 U.S.C. 154(b) by 260 days.

(21) Appl. No.: 18/031,266

(22) PCT Filed: Sep. 13, 2021

(86) PCT No.: PCT/DE2021/100754
§ 371 (c)(1),
(2) Date: Apr. 11, 2023

(87) PCT Pub. No.: WO2022/078544
PCT Pub. Date: Apr. 21, 2022

(65) Prior Publication Data
US 2023/0387761 A1  Nov. 30, 2023

(30) Foreign Application Priority Data
Oct. 12, 2020 (DE) .......................... 102020126632.4

(51) Int. Cl.
*H02K 11/25* (2016.01)

(52) U.S. Cl.
CPC .................................. *H02K 11/25* (2016.01)

(58) Field of Classification Search
USPC .............................................. 310/68 B, 68 C
See application file for complete search history.

(56) References Cited

U.S. PATENT DOCUMENTS

| | | | |
|---|---|---|---|
| 2018/0156669 A1 | 6/2018 | Koyama et al. | |
| 2019/0372435 A1* | 12/2019 | Song | H02K 11/25 |
| 2020/0259401 A1* | 8/2020 | Baba | H02K 11/21 |
| 2021/0152056 A1* | 5/2021 | Yang | H01C 7/008 |
| 2022/0221347 A1* | 7/2022 | Czerlewitz | H02K 11/25 |
| 2022/0263387 A1* | 8/2022 | Silvery | H02K 11/25 |
| 2022/0337132 A1* | 10/2022 | Silvery | H02K 3/345 |

FOREIGN PATENT DOCUMENTS

| | | | | |
|---|---|---|---|---|
| DE | 102018206985 A1 | | 2/2019 | |
| DE | 102018119831 A1 | | 2/2020 | |
| EP | 2924854 | * | 9/2015 | H02K 11/00 |
| EP | 2924854 A1 | | 9/2015 | |
| EP | 3715806 A1 | | 9/2020 | |

(Continued)

*Primary Examiner* — Ahmed Elnakib
(74) *Attorney, Agent, or Firm* — Volpe Koenig

(57) ABSTRACT

A device for measuring the temperature of a coil device in an electric machine having a temperature sensor, a first section which produces a first restoring force, a second section which receives the temperature sensor, a third section which has a first fixing element, and a fourth section which produces a second restoring force. The first restoring force and the second restoring force act in a common direction, and the second section is arranged between the first section and the fourth section.

11 Claims, 4 Drawing Sheets

(56) References Cited

FOREIGN PATENT DOCUMENTS

| FR | 3037738 | A1 |   | 12/2016 |   |
|----|---------|----|---|---------|---|
| JP | 2010276630 | A |   | 12/2010 |   |
| JP | 202020685 |   |   | 2/2020 |   |
| WO | 2019076540 | A1 |   | 4/2019 |   |
| WO | WO-2023188600 | A1 | * | 10/2023 | ............... G01K 1/14 |

* cited by examiner

ATTACHMENT OF A TEMPERATURE SENSOR TO AN INTERCONNECTION RING OF AN ELECTRIC MACHINE

CROSS-REFERENCE TO RELATED APPLICATIONS

This application is the U.S. National Phase of PCT Appln. No. PCT/DE2021/100754, filed Sep. 13, 2021, which claims the benefit of German Patent Appln. No. 102020126632.4, filed Oct. 12, 2020, the entire disclosures of which are incorporated by reference herein.

TECHNICAL FIELD

The disclosure relates to a device for receiving a sensor, a stator of an electrical machine and a method for producing a stator.

BACKGROUND

It is generally known that a temperature can be detected in electrical machines for the purpose of driving the electrical machine. In this case, the temperature can be detected, for example, both by a sensor system arranged inside the windings and by a sensor system applied to the windings from the outside.

A known problem when attaching temperature sensors consists in tempera-ture-related expansions of different magnitudes, which can lead to the temperature sensor becoming detached, in particular when adhesives are used to fix the tempera-ture sensor in place. If temperature information is also used for the purpose of control-ling the electrical machine, detachment of the temperature sensor can lead to damage to the electrical machine due to incorrect temperature measurement as a result of changed temperature transitions.

As an alternative to fixing the temperature sensor to the winding by means of gluing, prestressed systems are known in which the temperature sensor is pressed onto the winding by means of a spring element.

In this regard, a device for receiving a sensor according to the preamble of claim 1 is known from document DE102018206985A1.

An electrical machine with a temperature sensor is known in detail from DE102018206985A1, in which the sensor is pressed against an electrical conductor of the coil winding via the clamping force of a holding element. The holding element is held on a counter-element outside of the coil winding.

SUMMARY

The disclosure is based on the object of making available a reliable measurement of a temperature in electrical machines.

This object is achieved by the measures described in the independent claims. Advantageous embodiments can be found in the dependent claims.

According to one aspect, the device for measuring a temperature of a coil device in an electrical machine includes a temperature sensor. Furthermore, the device comprises a first section, which produces a first restoring force, a second section, which receives the temperature sensor, a third section with a fixing element, and a fourth section, which produces a second restoring force. An effect of the first restoring force and an effect of the second restoring force have a common direction. The second section is located between the first section and the fourth section. In particular, the temperature sensor is encased in a shrink tube and forms a rectangle in a projec-tion. In an advantageous embodiment, the individual sections are arranged predominantly linearly.

According to one embodiment, the first fixing element is designed as a translatory fixed bearing. In particular, the device comprises a fifth section containing a second fixing element, the second fixing element having a translational degree of freedom. As a result, both manufacturing tolerances and expansions that occur as a result of temperature fluctuations due to activation of the electrical machine are compensated for.

In particular, the first fixing element is realized by a rotationally symmetrical recess. Advantageously, this is a round recess, which is realized, for example, by a bore or a punching tool.

The translational degree of freedom of the second fixing element is advantageously designed as a slot. In particular, the slot can be realized by a drilling/milling tool or a punching tool. Advantageously, the slot allows a length compensation of the device due to manufacturing tolerances and expansions occurring due to temperature fluctuations.

In an advantageous embodiment, the second section, which accommodates the temperature sensor, has a cable guide in which a cable of the temperature sensor is routed. The guide is designed in particular as a shaft in which the cable is guided and bent in such a way that it is guided to a predetermined position.

According to a further aspect, the device is part of a stator of an electrical machine. In addition to a device according to the aspect described above or the configurations described above, the stator includes a coil device, which forms an end winding in the axial direction, and an interconnection ring. In particular, the first section and the fourth section act as spring elements with the third section and the fifth section as fixing elements via the second section containing the temperature sensor and the interconnection ring in such a way that the temperature sensor presses on the coil device. The temperature sensor is aligned in such a way that it presses on the end winding in the axial direction of the stator.

In a further embodiment, the interconnection ring has a first dome onto which the first fixing element is placed. The interconnection ring also has a second dome onto which the second fixing element is placed.

In particular, the first dome has a positive connection with the third section.

According to a further aspect, a method for producing a stator according to the aspect described above and corresponding configuration has the following steps:
- attaching the device to the first dome and the second dome,
- heat staking the first dome to the third section,
- inserting the temperature sensor into the second section, and
- positioning the temperature sensor on the end winding by moving the interconnection ring in the axial direction up to a predetermined installation position.

BRIEF DESCRIPTION OF THE DRAWINGS

The disclosure is explained in more detail below using the exemplary embodiment shown in the figures. In the figures.

DETAILED DESCRIPTION

The following is a description of a first embodiment of the present disclosure.

Figure 1:
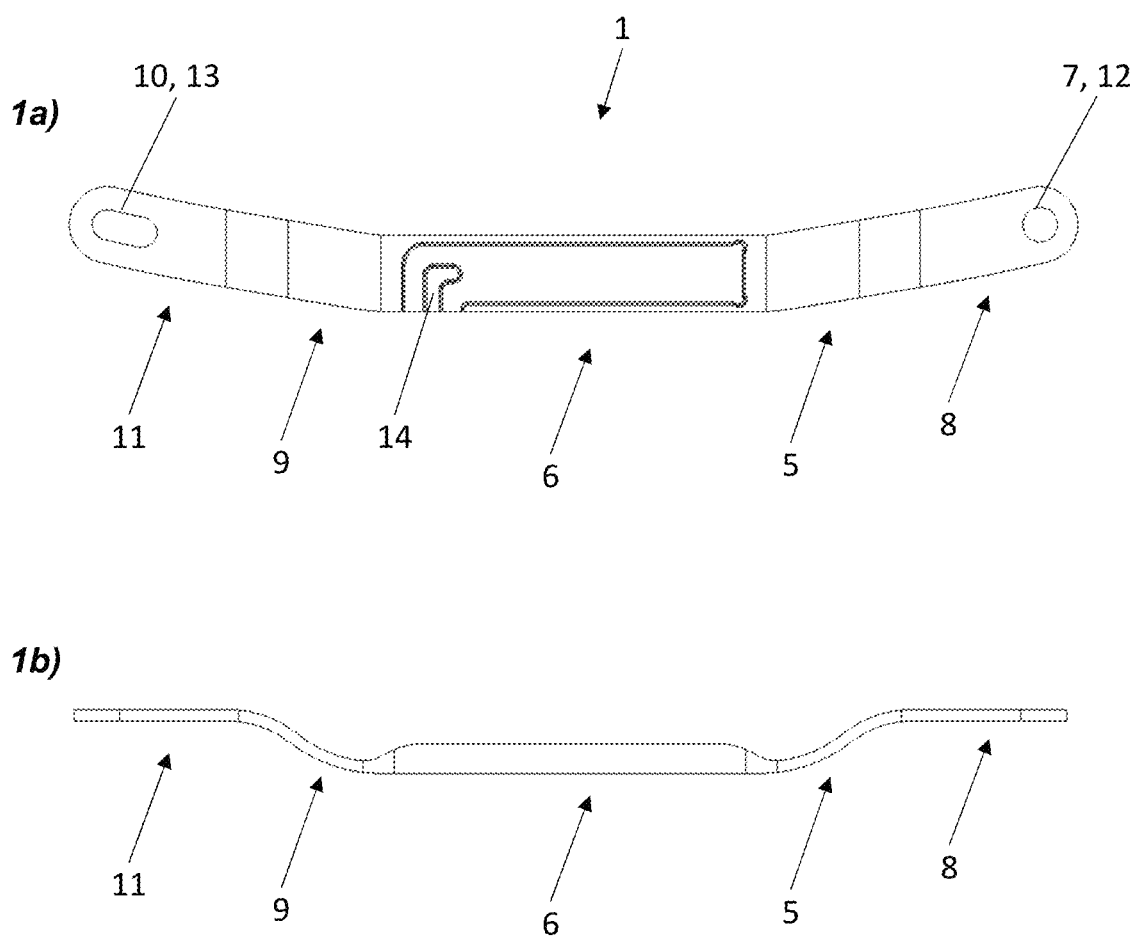
FIG. 1 shows a device in two different perspectives.

FIG. 1 shows a device 1 in two different perspectives 1a and 1b. The device 1 is designed in one piece and comprises a second section 6 in the middle for ac-commodating a rectangular temperature sensor 4 (not shown in the illustration). A cable guide 14 is provided in the second section 6, which guides a cable 15 (not shown in the illustration) preferably at an angle, more preferably bent at right angles. A first section 5 and a fourth section 9 are arranged adjacent to the second section 6 in such a way that the second section 6 is located centrally between the first section 5 and the fourth section 9.

A third section 8 adjoins the side of the first section 5 opposite the second section 6. The third section 8 includes a first fixing element 7, which is designed as a rotationally symmetrical recess 12 in the form of a hole.

A fifth section 11 adjoins the side of the fourth section 9 opposite the second section 6. The fifth section 11 includes a second fixing element 10 which has a translational degree of freedom in the form of a slot 13.

Both the first section 5 and the fourth section 9 each have spring-elastic properties to bring about both a first restoring force of the first section 5 and a second restoring force of the fourth section 9. A common direction of the first restoring force and the second restoring force results in the vertical direction in FIG. 1b.

If the device 1 is pressed together in the vertical direction in FIG. 1b, the slot 13 results in length compensation in the horizontal direction in FIG. 1b, in particular when the first fixing element 7 is designed as a translatory fixed bearing.

Figure 2:
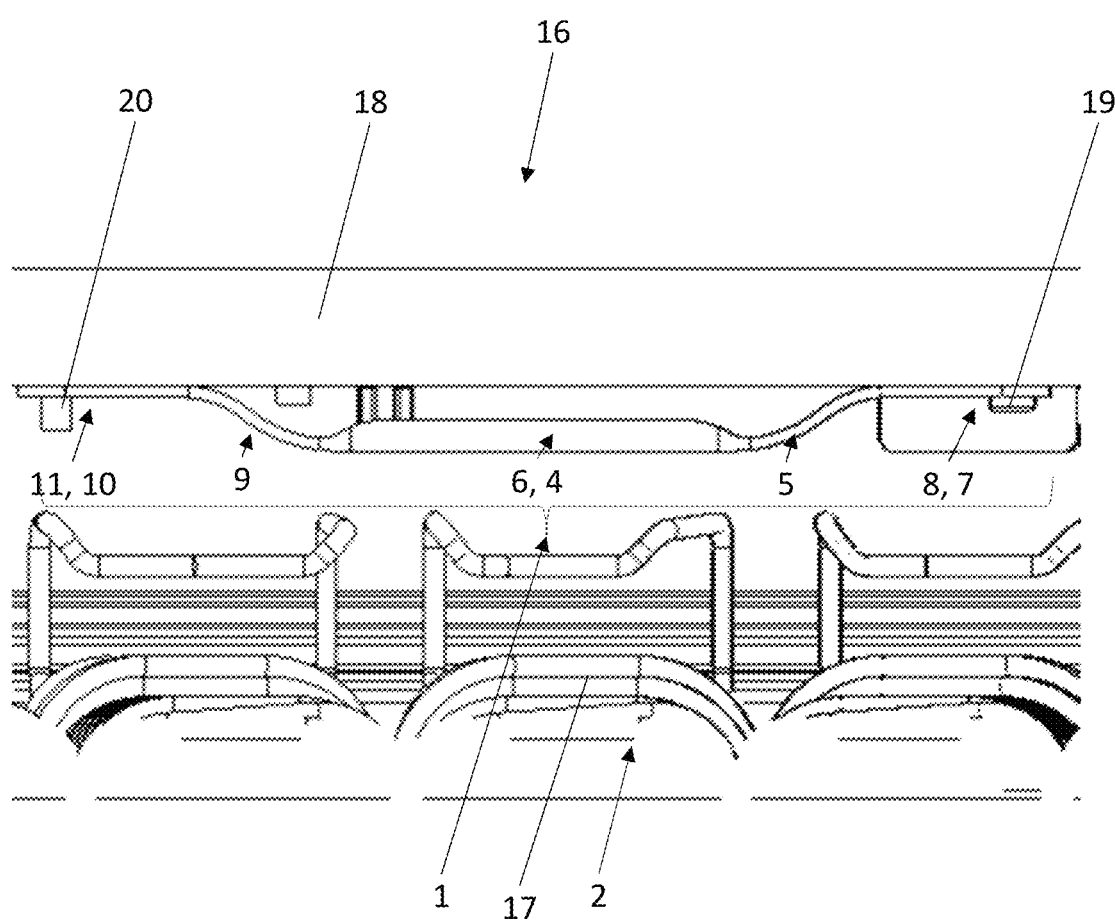
FIG. 2 shows a section of a stator with the device described in FIG. 1 in a first position.

FIG. 2 shows a section of a stator 16 with the device 1 described in FIG. 1 in a first position, viewed in the radial direction. Directions, such as radial and axial, relate to the stator and its axis of rotation. In addition to a plurality of coil devices 2, which form end windings 17 in the axial direction, the stator 16 includes an interconnection ring 18. A first dome 19 and a second dome 20 are located on the interconnection ring, by means of which the fixing of the device 1 is realized via the first fixing element 7 and the second fixing element 10.

Figure 3:
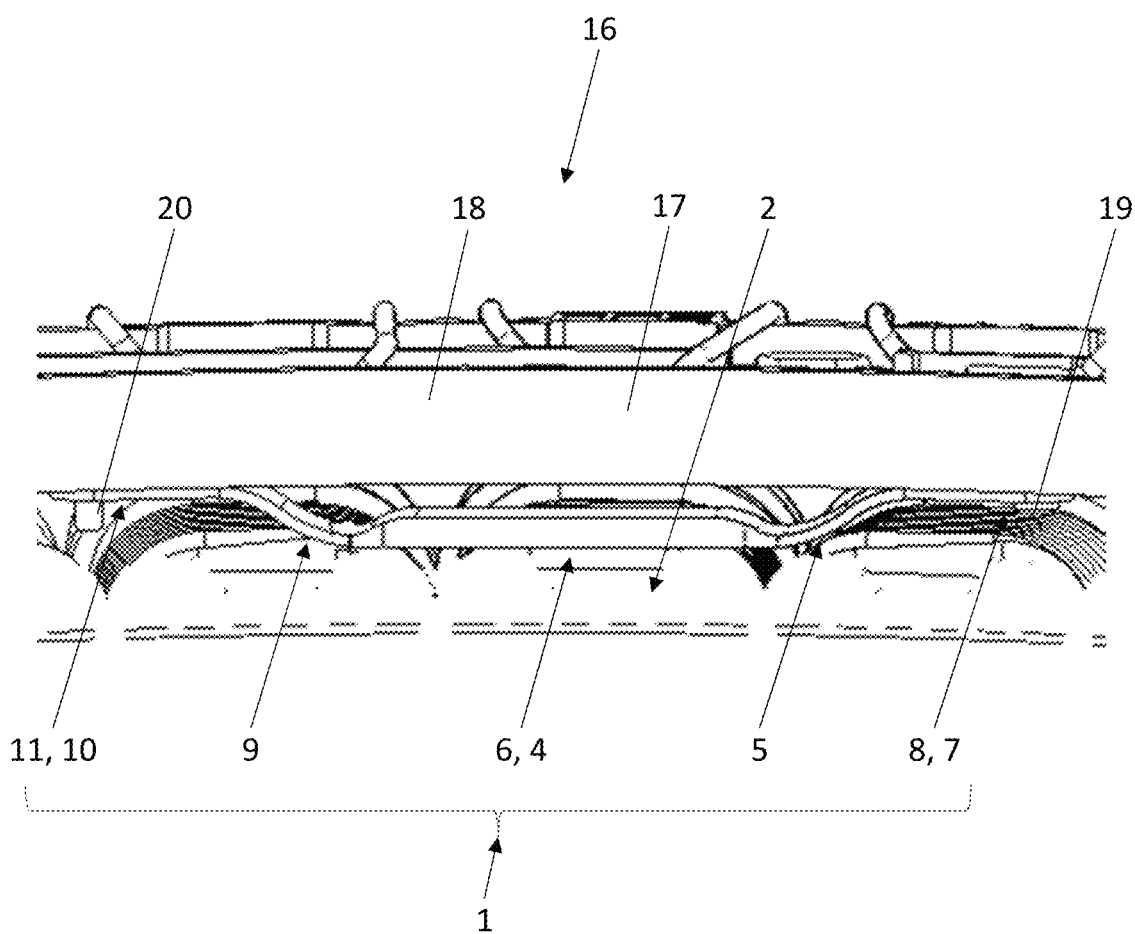
FIG. 3 shows the section of the stator from FIG. 2 in a second position.

FIG. 3 shows the section of the stator 16 from FIG. 2 in a second position. The temperature sensor 4 contained in the second section 6 is pressed onto the end winding 17 by the interconnection ring 18 in a defined position via the restoring force of the first section 5 and the fourth section 9. Due to the spring-elastic properties of the first section 5 and the fourth section 9, different axial characteristics and angle errors resulting from manufacturing tolerances or thermal expansion are compensated for and contact between the temperature sensor 4 and the end winding 17 is also ensured. The compensation described is advantageously possible by designing the second fixing element 10 as a slot 13.

Figure 4:
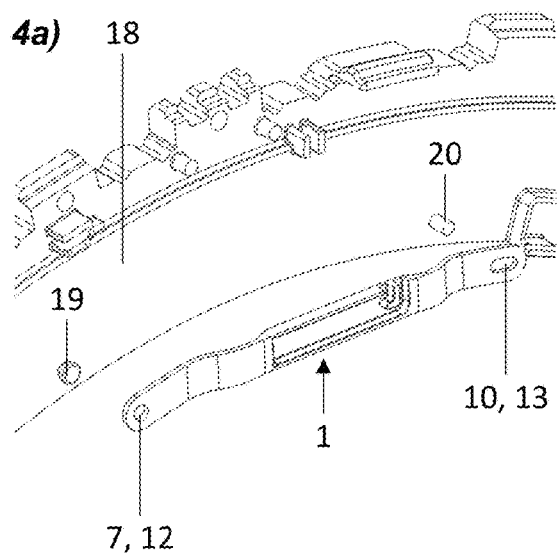
FIG. 4 shows process steps for producing the stator according to FIGS. 2 and 3.
Figure 4:
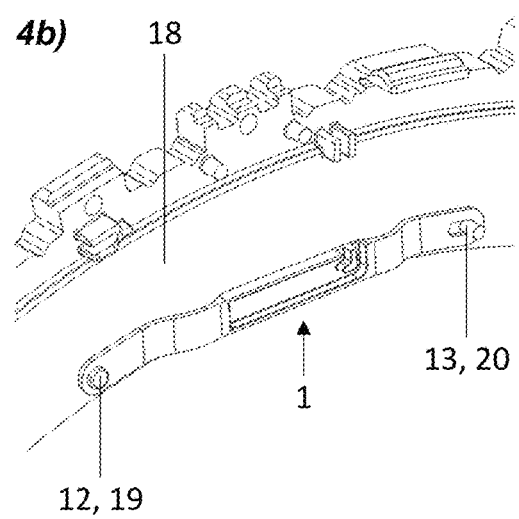
Figure 4:
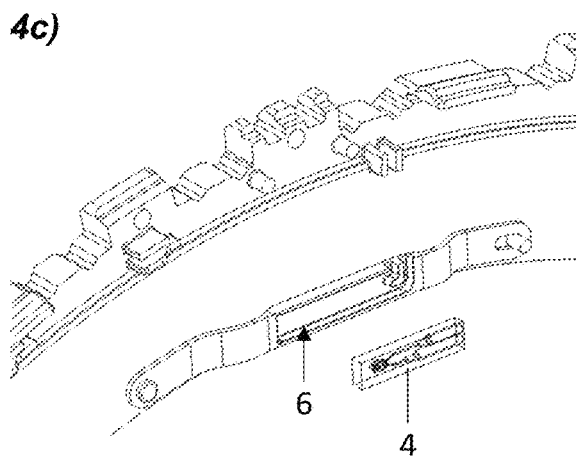
Figure 4:
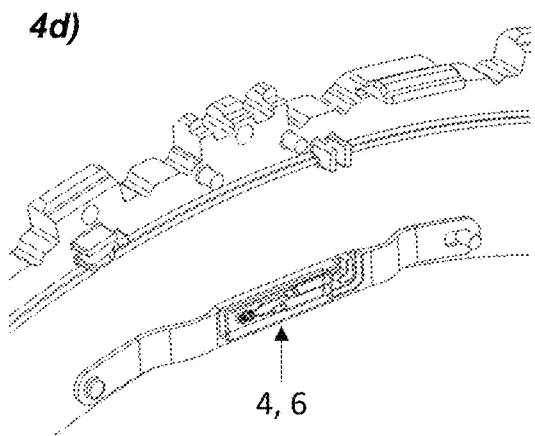

FIG. 4 shows several intermediate statuses in method steps for producing the stator according to FIG. 3.

In the method step in FIG. 4a, the device 1 is aligned with the interconnection ring 18 in such a way that the first fixing element 7 is aligned with the first dome 19 and the second fixing element 10 with the second dome 20.

In the method step in FIG. 4b, the interconnection ring 18 is slipped onto the stator. After heat staking the first dome 19 with the rotationally symmetrical recess 12 designed as a hole, these form a translatory fixed bearing. The second dome 20, together with the slot 13, forms a translational degree of freedom, which is in the tan-gential direction of the stator in the illustration shown.

In the method step in FIG. 4c, the temperature sensor 4, which is shown in a simplified representation without the cable 15, is aligned in such a way that it can be inserted into the second section 6 of the device 1 or attached to it.

In the method step in FIG. 4d, the temperature sensor 4 is inserted into the second section 6 in such a way that the interconnection ring 18, the device 1 and the temperature sensor 4 are in an operative relationship with one another with regard to a prestress which presses the temperature sensor 4 onto the end winding.

Reference is again made to FIG. 2 for the representation of the interconnection ring 18 with the temperature sensor 4 contained via the device 1 and coil devices 2 together with end windings 17. To position the temperature sensor 4, the interconnection ring 18 is moved in the axial direction to a predetermined position in such a way that the temperature sensor 4 presses on the end winding 17 according to FIG. 3.

Although the present disclosure has been described above in terms of an embodiment, it is to be understood that various modifications and changes can be made without departing from the scope of the present disclosure as defined in the ap-pended claims.

With regard to further features and advantages of the present disclosure, reference is expressly made to the disclosure of the drawing.

LIST OF REFERENCE SYMBOLS

1 Device
2 Coil device
3 Electrical machine
4 Temperature sensor
5 First section
6 Second section
7 First fixing element
8 Third section
9 Fourth section
10 Second fixing element
11 Fifth section
12 Rotationally symmetrical recess
13 Slot
14 Cable routing
15 Cable
16 Stator
17 End winding
18 Interconnection ring
19 First dome
20 Second dome

The invention claimed is:

1. A device for measuring a temperature of a coil device in an electrical machine, the device having:
a temperature sensor;
a first section which produces a first restoring force;
a second section which receives the temperature sensor; and
a third section which has a first fixing element; and
a fourth section which produces a second restoring force;

wherein the first restoring force and the second restoring force act in a common direction, and the second section is arranged between the first section and the fourth section;

wherein the first fixing element comprises a translatory fixed bearing, and the device further comprises a fifth section having a second fixing element, wherein the second fixing element has a translational degree of freedom.

2. The device according to claim 1, wherein the first fixing element is realized by a rotationally symmetrical recess.

3. The device according to claim 1, wherein the translational degree of freedom is realized by a slot.

4. The device according to claim 1, wherein the second section comprises a cable guide in which a cable of the temperature sensor is guided.

5. A stator of an electrical machine, the stator having:
a device for measuring a temperature of a coil device in the electrical machine, the device having:
a temperature sensor;
a first section which produces a first restoring force;
a second section which receives the temperature sensor; and
a third section which has a first fixing element;
a fourth section which produces a second restoring force;
a fifth section having a second fixing element; wherein the first restoring force and the second restoring force act in a common direction, and the second section is arranged between the first section and the fourth section;
the coil device, which forms an end winding in an axial direction of the stator; and
an interconnection ring, wherein through the interaction of the interconnection ring, the first section, the second section, the third section, the fourth section and the fifth section, the first restoring force and the second restoring force press the temperature sensor onto the coil device in the common direction, and the temperature sensor is aligned in such a way that it presses on the end winding in the axial direction;
wherein: the interconnection ring has a first dome onto which the first fixing element is placed, and the interconnection ring has a second dome onto which the second fixing element is placed.

6. The stator according to claim 5, wherein the first dome has a positive connection with the third section.

7. The stator according to claim 5, wherein the first fixing element comprises a translatory fixed bearing, and wherein the second fixing element has a translational degree of freedom.

8. The stator according to claim 7, wherein the first fixing element is realized by a rotationally symmetrical recess.

9. The stator of claim 7, wherein the translational degree of freedom is realized by a slot.

10. The stator according to claim 5, wherein the second section comprises a cable guide in which a cable of the temperature sensor is guided.

11. A method of producing a stator having a device for measuring a temperature of a coil device in an electrical machine the device having:
a temperature sensor;
a first section which produces a first restoring trace;
a second section which receives the temperature sensor; and
a third section which has a first fixing element;
a fourth section which produces a second restoring force;
a fifth section having a second fixing element;
wherein the first restoring force and the second restoring force act in a common direction, and the second section is arranged between the first section and the fourth section;
a coil device, which forms an end winding in an axial direction of the stator and an interconnection ring, wherein through the interaction of the interconnection ring, the first section, the second section, the third section, the fourth section and the fifth section the first restoring force and the second restoring force press the temperature sensor onto the coil device in the common direction, and the temperature sensor is aligned in such a way that it presses on the end winding in the axial direction, the interconnection tin, has a first dome onto which the first fixing element is placed, and the interconnection ring has a second dome onto which the second fixing element is placed, the method comprising the steps of: attaching the device to the first dome and the second dome, heat staking the first dome to the third section, inserting the temperature sensor into the second section, and positioning the temperature sensor on the end winding by moving the interconnection ring in the axial direction up to a predetermined installation position.

* * * * *